(12) United States Patent
Nakayama et al.

(10) Patent No.: US 11,444,469 B2
(45) Date of Patent: Sep. 13, 2022

(54) MANAGEMENT DEVICE AND POWER STORAGE SYSTEM

(71) Applicant: SANYO Electric Co., Ltd., Osaka (JP)

(72) Inventors: Masato Nakayama, Hyogo (JP); Hidetsugu Mukae, Hyogo (JP); Yousuke Nakagawa, Hyogo (JP); Masanori Ito, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 126 days.

(21) Appl. No.: 17/053,103

(22) PCT Filed: Apr. 5, 2019

(86) PCT No.: PCT/JP2019/015094
§ 371 (c)(1),
(2) Date: Nov. 5, 2020

(87) PCT Pub. No.: WO2019/220804
PCT Pub. Date: Nov. 21, 2019

(65) Prior Publication Data
US 2021/0234378 A1 Jul. 29, 2021

(30) Foreign Application Priority Data
May 14, 2018 (JP) .............................. JP2018-093226

(51) Int. Cl.
*H01M 10/46* (2006.01)
*H02J 7/00* (2006.01)
(Continued)

(52) U.S. Cl.
CPC ............ *H02J 7/0016* (2013.01); *B60L 58/22* (2019.02); *H01M 10/0525* (2013.01);
(Continued)

(58) Field of Classification Search
CPC .... H02J 7/00308; H02J 7/0047; H02J 7/0016; H01M 10/46; H01M 10/482;
(Continued)

(56) References Cited

U.S. PATENT DOCUMENTS

| 2011/0127962 A1 | 6/2011 | Murao et al. |
| 2016/0028257 A1* | 1/2016 | Hashimoto ........... H02J 7/0047 320/112 |

(Continued)

FOREIGN PATENT DOCUMENTS

| EP | 2328256 A2 * | 6/2011 | .............. B60L 58/19 |
| EP | 2328257 A2 * | 6/2011 | ............ H02J 7/0016 |
| JP | 2011-115015 | 6/2011 | |

OTHER PUBLICATIONS

International Search Report of PCT application No. PCT/JP2019/015094 dated Jul. 2, 2019.

*Primary Examiner* — Edward Tso
(74) *Attorney, Agent, or Firm* — WHDA, LLP

(57) ABSTRACT

In order to improve safety while suppressing a decrease in efficiency of an equalizing process between a plurality of cells, controller executes an equalizing process between a plurality of cells by controlling a plurality of discharge circuits based on voltages of the plurality of cells measured by voltage measurement unit. Anomaly determination circuit determines whether or not the voltage of each of cells measured by voltage measurement unit is within a normal range. Controller includes, for each first cycle, a first discharge suspension period during which the voltages of the plurality of cells are measured without an influence of the equalizing process during execution of the equalizing process between the plurality of cells and includes, for each second cycle longer than the first cycle, a second discharge
(Continued)

suspension period during which a determination result according to anomaly determination circuit is fixed.

5 Claims, 4 Drawing Sheets

(51) Int. Cl.
*B60L 58/22* (2019.01)
*H01M 10/0525* (2010.01)
*H01M 10/42* (2006.01)
*H01M 10/44* (2006.01)
*H01M 10/48* (2006.01)

(52) U.S. Cl.
CPC ....... *H01M 10/425* (2013.01); *H01M 10/441* (2013.01); *H01M 10/482* (2013.01); *H02J 7/0047* (2013.01); *H02J 7/00308* (2020.01); *H01M 2010/4271* (2013.01)

(58) Field of Classification Search
CPC ............. H01M 10/441; H01M 10/425; H01M 2010/4271; B60L 58/22; B60L 2240/80
USPC .................. 320/107, 114, 118, 125, 130, 135
See application file for complete search history.

(56) References Cited

U.S. PATENT DOCUMENTS

2017/0214266 A1* 7/2017 Takahashi ............ G01R 31/392
2019/0288344 A1* 9/2019 Nakao .................. B60L 3/0046

* cited by examiner

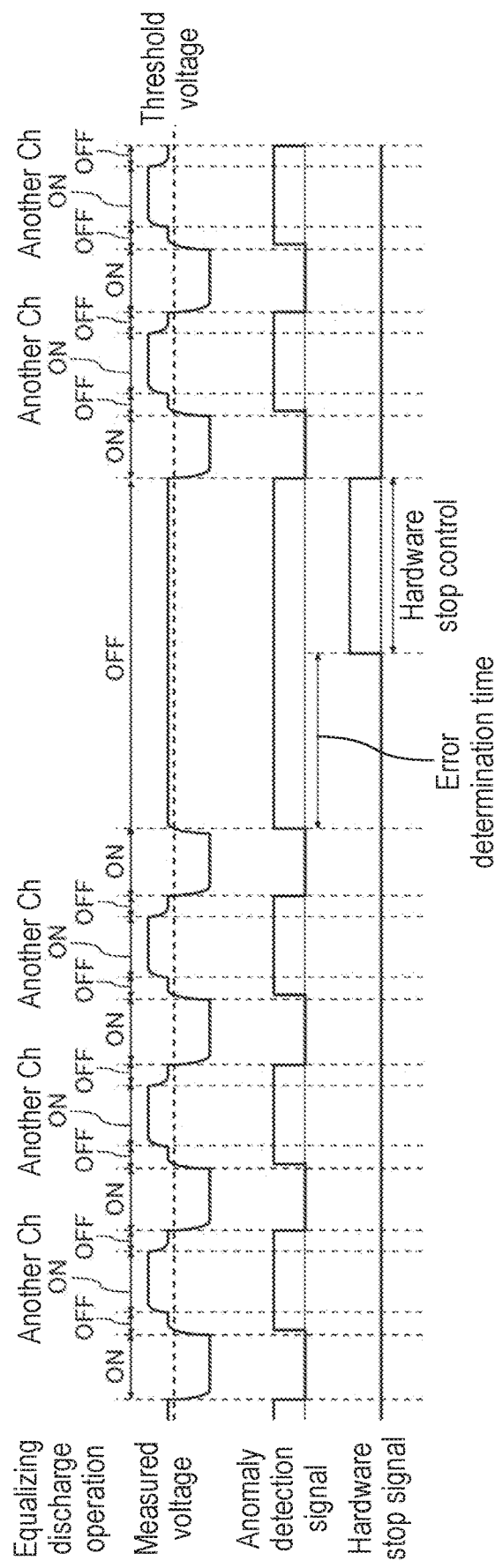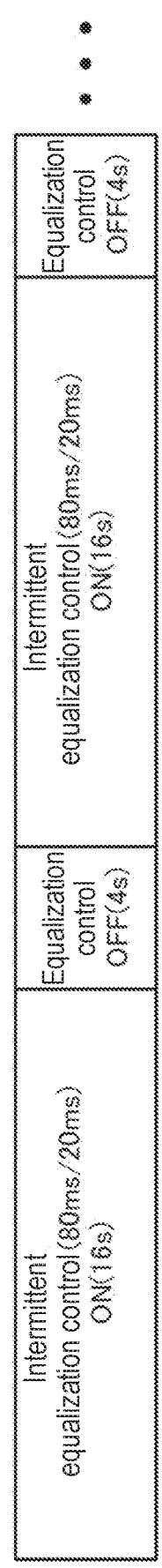

MANAGEMENT DEVICE AND POWER STORAGE SYSTEM

CROSS-REFERENCE TO RELATED APPLICATIONS

This application is a U.S. national stage application of the PCT International Application No. PCT/JP2019/015094 filed on Apr. 5, 2019, which claims the benefit of foreign priority of Japanese patent application No. 2018-093226 filed on May 14, 2018, the contents all of which are incorporated herein by reference.

TECHNICAL FIELD

The present invention relates to a management device and a power storage system that manage states of a plurality of cells connected in series.

BACKGROUND ART

In recent years, hybrid vehicles (HV), plug-in hybrid vehicles (PHV), and electric vehicles (EV) have become popular. Secondary batteries are mounted as key devices in these vehicles. Lithium-ion batteries have become the mainstream as secondary batteries for vehicles.

Usually, in a lithium-ion battery, from the viewpoint of ensuring safety, each voltage of a plurality of cells connected in series is constantly monitored by a voltage measuring circuit. Each input terminal of the voltage measuring circuit and each node (including both ends) of a plurality of cells are connected by wiring, and the voltage measuring circuit measures the voltage between two adjacent wirings to measure the voltage of each cell. The voltage of each cell measured by the voltage measuring circuit is transmitted to a microcomputer and variously used for control, and it is monitored whether or not the voltage of each cell is within a normal range.

In the lithium-ion battery, in order to utilize the ability of the battery to a maximum extent, an equalizing process for equalizing the capacities between a plurality of cells connected in series is executed. A passive balance method is the mainstream for the equalizing process between the plurality of cells. In the passive balance method, between a plurality of cells connected in series, the cells other than the cell having the smallest capacity are discharged such that the capacities of the other cells match the capacity of the cell having the smallest capacity.

A discharge circuit for equalization is generally configured to be connected between two adjacent wirings in the plurality of wirings for voltage measurement (for example, see PTL 1). In this configuration, the voltage of the cell during equalizing discharge appears to be reduced by an amount of voltage drop due to a wiring resistance from the voltage measurement circuit. The voltage drop due to the wiring resistance becomes larger as the wiring (mainly the wire harness) is longer and/or an equalization current is larger.

In in-vehicle applications, the voltage of each cell measured by the voltage measurement circuit is often monitored in a redundant configuration. Specifically, the voltage of each cell measured by the voltage measurement circuit is monitored under software control by a microcomputer and also monitored under hardware control by a dedicated anomaly detection circuit. The anomaly detection circuit determines that an error occurs when the measured cell voltage continuously shows an abnormal value for a predetermined time. Since the anomaly detection circuit also detects the cell voltage during the equalizing discharge lower by the voltage drop due to the wiring resistance, the cell voltage during the equalizing discharge may be erroneously determined. For example, a voltage higher than an upper limit threshold may be erroneously determined as a normal voltage.

CITATION LIST

Patent Literature

PTL 1: Unexamined Japanese Patent Publication No. 2011-115015

SUMMARY OF THE INVENTION

To supply an accurate cell voltage from the voltage measurement circuit to the microcomputer and the anomaly determination circuit during the equalizing process, it is conceivable to periodically stop the discharge during the equalizing process and measure the cell voltage during the suspension period.

Since the cell voltage finely changes in a short time, the microcomputer acquires the cell voltage from the voltage measurement circuit in a short cycle for control. When the discharge is periodically stopped during the equalizing process as described above, it is necessary to set a discharge suspension period in a short cycle.

When the length of the discharge suspension period of each cycle is set to be long, a discharge time for equalization becomes short, and a time until equalization is completed becomes long. On the other hand, if the length of the discharge suspension period is set to be short, it becomes impossible to secure a time required for the anomaly detection circuit to determine an error.

The present invention has been made in view of such circumstances, and an object thereof is to provide a technique of improving safety while suppressing a decrease in efficiency of the equalizing process between a plurality of cells.

In order to solve the above problems, a management device according to an aspect of the present invention includes a voltage measurement unit that measures a voltage of each of a plurality of cells connected in series, a plurality of discharge circuits connected in parallel to each of the plurality of cells, an anomaly determination circuit that determines whether or not the voltage of each of the plurality of cells measured by the voltage measurement unit is within a normal range, and a controller that executes an equalizing process between the plurality of cells by controlling the plurality of discharge circuits based on the voltages of the plurality of cells measured by the voltage measurement unit. The controller sets, for each first cycle, a first discharge suspension period during which the voltages of the plurality of cells are measured without an influence of the equalizing process during execution of the equalizing process between the plurality of cells and sets, for each second cycle longer than the first cycle, a second discharge suspension period during which a determination result according to the anomaly determination circuit is fixed.

According to the present invention, it is possible to improve safety while suppressing a decrease in efficiency of the equalizing process between the plurality of cells.

BRIEF DESCRIPTION OF DRAWINGS

FIG. 4A is a diagram showing an example of the equalizing discharge operation for the plurality of cells and measured voltages of the plurality of cells according to an example.

FIG. 4B is a diagram showing an example of the equalizing discharge operation for the plurality of cells and measured voltages of the plurality of cells according to an example.

DESCRIPTION OF EMBODIMENT

Figure 1:
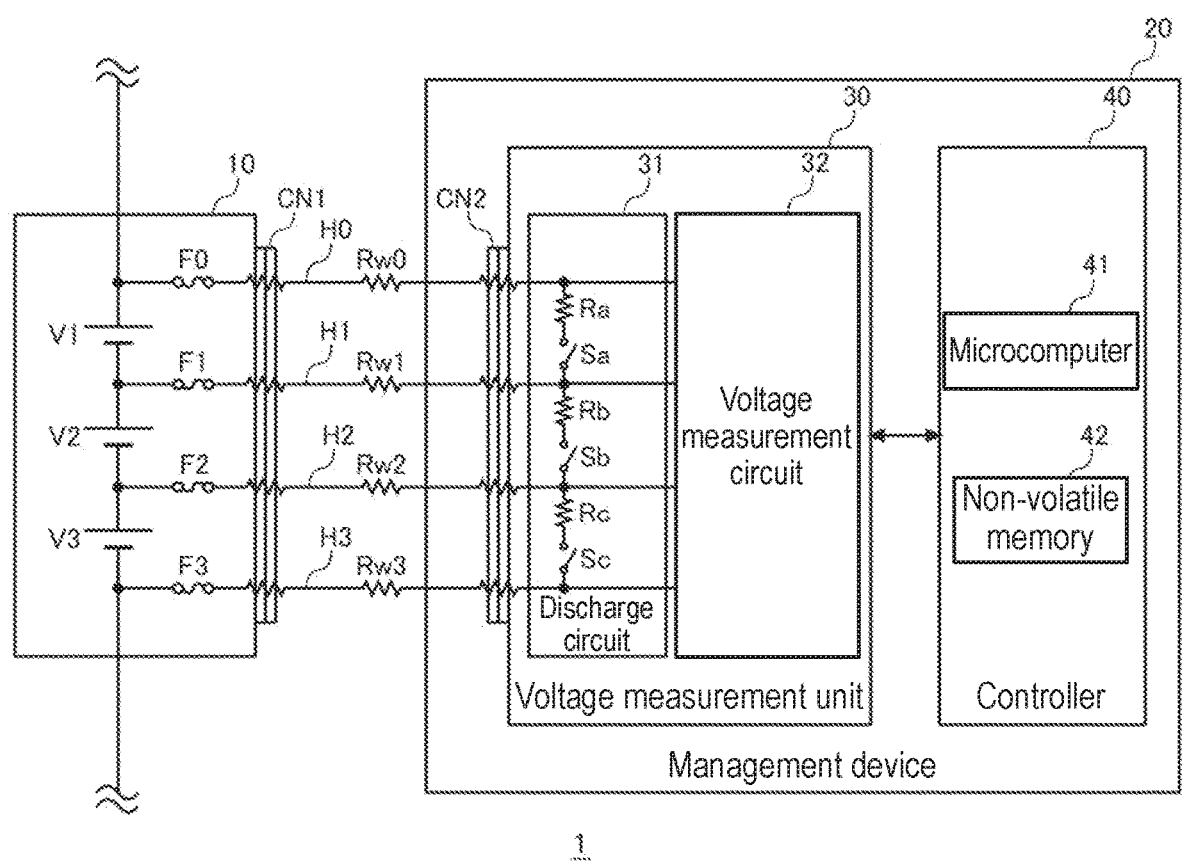
FIG. 1 is a diagram for explaining a power storage system according to an exemplary embodiment of the present invention.

FIG. 1 is a diagram for explaining power storage system 1 according to an exemplary embodiment of the present invention. Power storage system 1 is mounted on a vehicle and used as a battery for driving a vehicle. Power storage system 1 includes power storage module 10 and management device 20. Power storage module 10 includes a plurality of cells V1 to V3 connected in series. As the cell, a lithium-ion battery cell, a nickel hydrogen battery cell, a lead battery cell, an electric double layer capacitor cell, a lithium-ion capacitor cell, or the like can be used. Hereinafter, in the present specification, an example using a lithium-ion battery cell (nominal voltage: 3.6 to 3.7 V) is assumed.

For simplicity, FIG. 1 depicts power storage module 10 in which the three cells V1 to V3 are connected in series. However, in the actual configuration, more cells are connected in series in accordance with a voltage specification required for power storage system 1. A plurality of cells may be connected in series and parallel to increase the capacity.

Power storage module 10 includes first connector CN1 for connecting a plurality of wire harnesses H0 to H3. A plurality of internal-side terminals of first connector CN1 and a plurality of nodes of the plurality of cells V1 to V3 connected in series are respectively connected by a plurality of internal wirings. The nodes of the plurality of cells V1 to V3 are set between both ends of the plurality of cells V1 to V3 and two adjacent cells. Therefore, a number of nodes of the plurality of cells is (m+1), where m is a number of cells (m is an integer of more than or equal to 2). Similarly, a number of internal wirings in power storage module 10 and a number of wire harnesses are (m+1). In the example shown in FIG. 1, since the number of cells is 3, the number of nodes, the number of internal wirings, and the number of wire harnesses are each 4.

Fuses F0 to F4 are inserted into each of the plurality of internal wirings in power storage module 10. Fuses F0 to F4 are blown when a current more than or equal to a rated value flows through the fuses and protect the cell and the wire harness from overcurrent. The insertion of fuses F0 to F4 is not essential and can be omitted.

Management device 20 includes voltage measurement unit 30 and controller 40. Voltage measurement unit 30 includes discharge circuit 31 and voltage measurement circuit 32. Discharge circuit 31 and voltage measurement circuit 32 are installed on the same substrate.

Voltage measurement unit 30 includes second connector CN2 for connecting the plurality of wire harnesses H0 to H3. The plurality of wire harnesses H0 to H3 are respectively connected between a plurality of external-side terminals of first connector CN1 of power storage module 10 and the plurality of external-side terminals of second connector CN2 of voltage measurement unit 30. The plurality of internal-side terminals of second connector CN2 and a plurality of analog input terminals of voltage measurement circuit 32 are respectively connected by a plurality of internal wirings. A number of the internal wirings is also (m+1).

Voltage measurement circuit 32 measures each voltage of the plurality of cells V1 to V3 by measuring the voltage between two adjacent wirings between the plurality of internal wirings. Voltage measurement circuit 32 includes, for example, a multiplexer and an A/D converter. The multiplexer outputs the voltage between two adjacent wirings to the A/D converter in order from the top. The A/D converter converts an analog voltage input from the multiplexer into a digital value.

Voltage measurement circuit 32 transmits the measured voltages of the plurality of cells V1 to V3 to controller 40. Normally, since a ground potential of a substrate on which voltage measurement unit 30 is installed and a ground potential of a substrate on which controller 40 is installed are different (the former voltage is higher), information is transmitted by isolated communication between voltage measurement unit 30 and controller 40.

Discharge circuit 31 includes discharge resistors Ra to Rc and discharge switches Sa to Sc that are connected in series between two adjacent wirings of the plurality of internal wirings in voltage measurement unit 30. Discharge switches Sa to Sc are constituted of, for example, a semiconductor switch such as a metal-oxide-semiconductor field-effect transistor (MOSFET). When first discharge switch Sa is turned on, both ends of first cell V1 connected in parallel with first discharge switch Sa and first discharge resistor Ra become conductive, and first cell V1 is discharged. Other cells are similarly discharged when the discharge switches connected in parallel are turned on.

Controller 40 manages power storage module 10 based on the voltages, currents, and temperatures of the plurality of cells V1 to V3 that are measured by voltage measurement unit 30, a current measurement unit (not shown), and a cell temperature measurement unit (not shown). Controller 40 can be constituted of microcomputer 41 and non-volatile memory 42 (such as an electrically erasable programmable read-only memory (EEPROM) or flash memory).

Controller 40 estimates SOC (State Of Charge) and SOH (State Of Health) of the plurality of cells V1 to V3 based on the voltages, currents, and temperatures of the plurality of cells V1 to V3. The SOC can be estimated by, for example, an OCV (Open Circuit Voltage) method or a current integration method. The OCV method is a method of estimating the SOC based on the OCV of the cell measured by voltage measurement circuit 32 and characteristic data of an SOC-OCV curve held in advance. The current integration method is a method of estimating the SOC based on the OCV measured by voltage measurement circuit 32 at the start of charge/discharge of the cell and an integrated value of the measured current.

The SOH is defined as a ratio of a current full-charge capacity to an initial full-charge capacity, and shows that the lower the value (the closer to 0%), the more degradation progresses. Degradation of the secondary battery can be approximated by a sum of storage degradation and cycle degradation.

The storage degradation is degradation that progresses over time depending on the temperature of the secondary battery at each time point and the SOC at each time point, regardless of whether or not the secondary battery is being charged or discharged. The higher the SOC at each time point (the closer to 100%) or the higher the temperature at each time point, the higher a storage degradation rate.

The cycle degradation is degradation that progresses as a number of times of charge and discharge increases. Cycle degradation depends on an SOC range used, a temperature, and a current rate. The wider the SOC range used, the higher the temperature, or the higher the current rate, the higher the cycle degradation rate. As described above, the degradation of the secondary battery greatly depends on the usage environment, and a variation in the capacity between the plurality of cells V1 to V3 becomes larger as the usage period becomes longer.

Controller 40 executes an equalizing process between the plurality of cells V1 to V3 based on the voltages of the plurality of cells V1 to V3 received from voltage measurement unit 30. In a general passive cell balance method, other cells than the cell having the smallest capacity of the plurality of cells V1 to V3 are discharged to the capacity of the cell having the smallest capacity (hereinafter, referred to as a target value). The target value may be specified by any of the actual capacity, SOC, and OCV. When the target value is specified by the OCV, the OCV of the cell with the lowest OCV becomes the target value. The target value may be specified by a dischargeable amount or a chargeable amount.

Controller 40 sets a measured value of the cell having the smallest capacity of the plurality of cells V1 to V3 as the target value, and calculates differences between the target value and measured values of the other plurality of cells. Controller 40 calculates discharge amounts of the other plurality of cells based on the calculated respective differences, and calculates discharge times of the other plurality of cells based on the calculated respective discharge amounts. Controller 40 generates a control signal for the equalizing process that includes the discharge times of the plurality of cells and transmits the control signal to voltage measurement unit 30. A switch control circuit (not shown) in voltage measurement unit 30 controls each of the plurality of discharge switches Sa to Sc to be in the ON state for a designated time based on the control signal received from controller 40.

In the above circuit configuration, during a cell balancing operation by discharge circuit 31, the cell voltage measured by voltage measurement circuit 32 decreases or increases with respect to the actual voltage due to an influence of a wiring resistance. For example, during equalizing discharge of second cell V2, the current flows from a positive electrode of second cell V2 to a negative electrode of second cell V2 through first wire harness H1, second discharge resistor Rb, second discharge switch Sb, and second wire harness 112. In this current loop, in addition to a resistance component in voltage measurement unit 30, there are resistance components based on a wiring resistance of a first internal wiring in power storage module 10, a resistance of first fuse F1, a contact resistance of first connector CN1, wiring resistance Rw1 of first wire harness H1, a contact resistance (×2) of second connector CN2, wiring resistance Rw2 of second wire harness H2, a contact resistance of first connector CN1, a wiring resistance of a second internal wiring in power storage module 10, and a resistance of second fuse F2.

Hereinafter, a wiring resistance of a 0th internal wiring in power storage module 10, a resistance of 0th fuse F0, the contact resistance of first connector CN1, wiring resistance Rw0 of 0th wire harness H0, and the contact resistance of second connector CN2 are collectively referred to as 0th wiring resistance R0. Wiring resistance Rw0 of 0th wire harness H0 has the largest value among these resistances.

Similarly, the wiring resistance of the first internal wiring in power storage module 10, the resistance of first fuse F1, the contact resistance of first connector CN1, wiring resistance Rw1 of first wire harness H1, and the contact resistance of second connector CN2 are collectively referred to as first wiring resistance R1. The same applies to second wiring resistance R2 and third wiring resistance R3.

For example, by equalizing discharge of second cell V2, equalizing current Ib flows in a wiring path (hereinafter referred to as the first external wiring) from the positive electrode of second cell V2 to a first input terminal of voltage measurement unit 30, and equalizing current Ib flows in a wiring path (hereinafter referred to as the second external wiring) from a second input terminal of voltage measurement unit 30 to the negative electrode of second cell V2. It is assumed that first cell V1 and third cell V3 are not subjected to equalizing discharge. That is, it is assumed that no current flows in a 0th external wiring and a third external wiring.

A voltage drop of Vf1=(R1×Ib) occurs in the first external wiring. In addition, a voltage drop of Vf2=(R2×Ib) occurs in the second external wiring. As a result, a potential of a first input terminal of voltage measurement circuit 32 decreases by Vf1, and a potential of a second input terminal of voltage measurement circuit 32 increases by Vf2. As a result, a cell voltage of second cell V2 measured by voltage measurement circuit 32 is measured lower than the actual voltage by Vf1+Vf2. The cell voltage of first cell V1 adjacent to second cell V2 is measured higher than the actual voltage by Vf1. The cell voltage of third cell V3 adjacent to second cell V2 is measured higher than the actual voltage by Vf2.

When the cell balancing operation by discharge circuit 31 is not in progress, almost no current flows through the 0th external wiring to the third external wiring, and the cell voltage measured by voltage measurement circuit 32 and the actual voltage substantially match. On the other hand, during the cell balancing operation by discharge circuit 31, the longer a wire length of 0th wire harness H0 to third wire harness 113, and/or the larger an equalization current, the larger a difference between the cell voltage measured by voltage measurement circuit 32 and the actual voltage.

Figure 2:
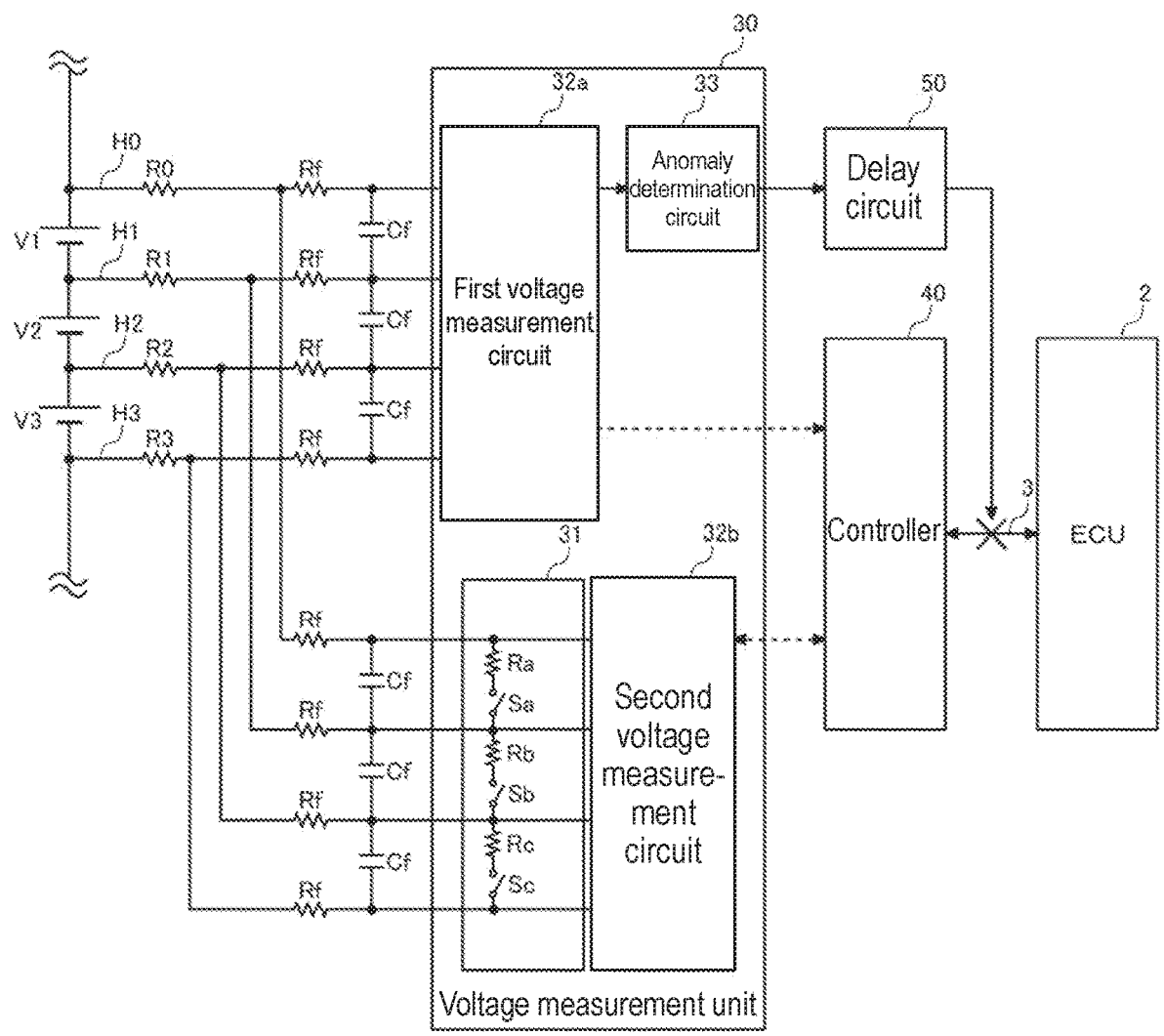
FIG. 2 is a diagram showing an example of the power storage system shown in FIG. 1.

FIG. 2 is a diagram showing an example of power storage system 1 shown in FIG. 1. For in-vehicle use, a configuration in which voltage measurement circuit 32 is made redundant is often adopted. In this example, voltage measurement unit 30 includes first voltage measurement circuit 32a, discharge circuit 31, second voltage measurement circuit 32b, and anomaly determination circuit 33. Voltage measurement unit 30 can be constituted of, for example, an application specific integrated circuit (ASIC). Discharge circuit 31 and second voltage measurement circuit 32b may be mounted in one chip.

Each of 0th wire harness H0 to third wire harness H3 is branched in the middle, one is connected to first voltage measurement circuit 32a, and the other is connected to second voltage measurement circuit 32b via discharge circuit 31. A low-pass filter is connected to each of an input stage of first voltage measurement circuit 32a and an input stage of discharge circuit 31. The low-pass filter is an RC filter including resistor Rf and capacitor Cf, and suppresses aliasing.

First voltage measurement circuit 32a measures each voltage of the plurality of cells V1 to V3 and supplies each measured voltage to controller 40 and anomaly determination circuit 33. As described above, voltage measurement unit 30 and controller 40 are connected by an insulated communication line, and first voltage measurement circuit 32a transmits each measured voltage of the plurality of cells V1 to V3 to controller 40 in accordance with a predetermined communication format. In voltage measurement unit 30, first voltage measurement circuit 32a outputs each measured voltage of the plurality of cells V1 to V3 to anomaly determination circuit 33.

Second voltage measurement circuit 32b measures each voltage of the plurality of cells V1 to V3 in parallel with first voltage measurement circuit 32a, and supplies each measured voltage to controller 40. Similar to first voltage measurement circuit 32a, second voltage measurement circuit 32b also transmits each measured voltage of the plurality of cells V1 to V3 to controller 40 in accordance with a predetermined communication format.

Second voltage measurement circuit 32b does not supply each voltage of the plurality of cells V1 to V3 to anomaly determination circuit 33. Regarding the cell voltage measurement, first voltage measurement circuit 32a is a main measurement circuit, and second voltage measurement circuit 32b is a sub-measurement circuit. Discharge circuit 31 for equalization is connected to second voltage measurement circuit 32b. In a channel in which the discharge switch is in the ON state, the measured voltage of second voltage measurement circuit 32b becomes substantially zero, so that second voltage measurement circuit 32b cannot measure the voltage of the channel during equalizing discharge. On the other hand, discharge circuit 31 for equalization is not connected to first voltage measurement circuit 32a. Therefore, in first voltage measurement circuit 32a, the voltage of the channel during equalizing discharge can be basically measured although affected by the voltage drop due to the wiring resistance. First voltage measurement circuit 32a continues to supply the measured voltages of all channels to controller 40 and anomaly determination circuit 33 regardless of the on/off state of the plurality of discharge switches Sa to Sc.

Anomaly determination circuit 33 is a dedicated hardware circuit that determines whether or not the voltage of each cell measured by first voltage measurement circuit 32a is within the normal range. Anomaly determination circuit 33 includes, for example, a digital comparator and determines whether or not the voltage of each cell is in an overvoltage (OV) state higher than the normal range, and whether or not the voltage of each cell is in an undervoltage (UV) state lower than the normal range.

Similarly, microcomputer 41 determines whether or not the voltage of each cell measured by first voltage measurement circuit 32a is within the normal range. Microcomputer 41 determines whether or not the voltage of each cell measured by second voltage measurement circuit 32b is within the normal range. When an anomaly occurs in the voltage of any cell measured by first voltage measurement circuit 32a or second voltage measurement circuit 32b, microcomputer 41 cuts off a contactor relay inserted in a power line between power storage system 1 and a load (not shown). Microcomputer 41 notifies electronic control unit (ECU) 2 in a vehicle of a cell voltage anomaly via vehicle-mounted network 3 (for example, a controller area network (CAN)). As described above, controller 40 detects the cell voltage anomaly by software control and notifies ECU 2 of the cell voltage anomaly. The contactor relay may be cut off by ECU 2.

On the other hand, anomaly determination circuit 33 outputs anomaly detection signal ALM to delay circuit 50 when an anomaly occurs in the voltage of any cell measured by first voltage measurement circuit 32a. Delay circuit 50 outputs a hardware stop signal when the anomaly detection signal is continuously detected for more than or equal to a predetermined period (for example, 500 ms).

In the example shown in FIG. 2, delay circuit 50 stops communication between controller 40 and ECU 2 by vehicle-mounted network 3 as hardware stop control. When ECU 2 detects interruption of a communication signal with controller 40, ECU 2 recognizes an anomaly of power storage system 1. As the hardware stop control, control for stopping communication by vehicle-mounted network 3 is an example, and the hardware stop control may be control for directly cutting off the contactor relay, for example.

Anomaly determination circuit 33 and delay circuit 50 protect the power storage system 1 by detecting the cell voltage anomaly by hardware control without using software control using microcomputer 41. Therefore, it is possible to construct a protection function having higher robustness than the protection function by software control through controller 40. In general, the response time of the hardware control is shorter than that of the software control.

However, the hardware control at the time of voltage anomaly detection using anomaly determination circuit 33 and delay circuit 50 is redundant emergency stop control, and, originally, power storage system 1 should be protected in a regular procedure under software control by the controller 40. Thus, when software control by the controller 40 functions normally, a predetermined delay time (for example, 500 msec) is set in delay circuit 50 such that power storage system 1 is protected by the software control by controller 40 before the hardware control by anomaly determination circuit 33 and delay circuit 50. The delay time is set to be longer than a time until completion of protection of power storage system 1 by software control by controller 40 since measurement of an abnormal voltage in any cell by first voltage measurement circuit 32a.

As described above, during the cell balancing operation by discharge circuit 31, the cell voltage measured by first voltage measurement circuit 32a is greatly affected by the voltage drop due to the wiring resistance of the external wiring. Thus, it is conceivable to perform control to periodically stop the cell balancing operation at the timing of measuring the voltages of the plurality of cells V1 to V3 by first voltage measurement circuit 32a and second voltage measurement circuit 32b.

Figure 3A:
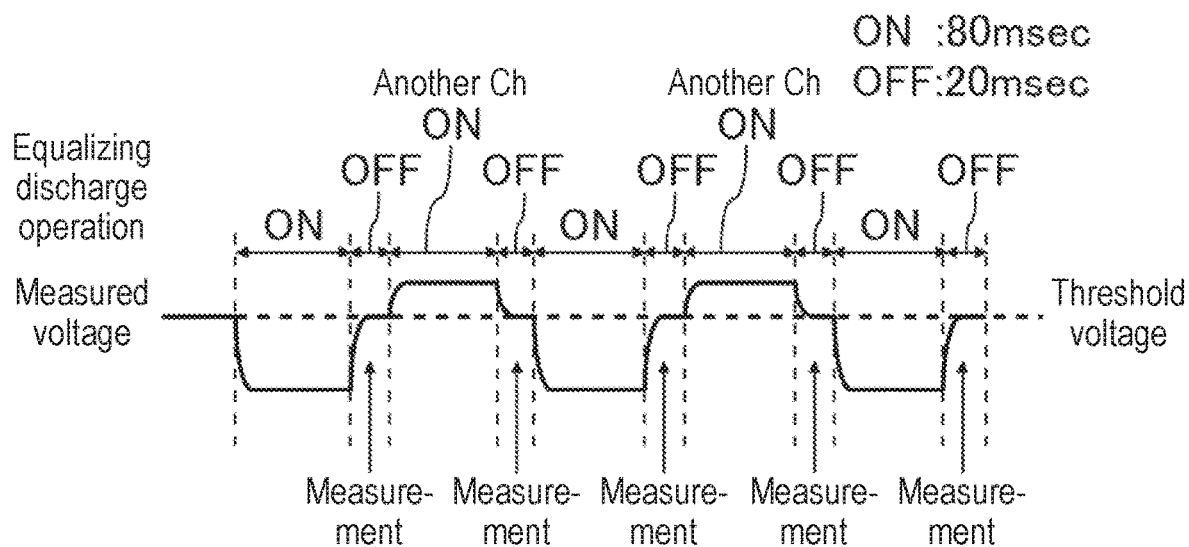
FIG. 3A is a diagram showing an example of an equalizing discharge operation for a plurality of cells and measured voltages of the plurality of cells according to a comparative example.
Figure 3B:
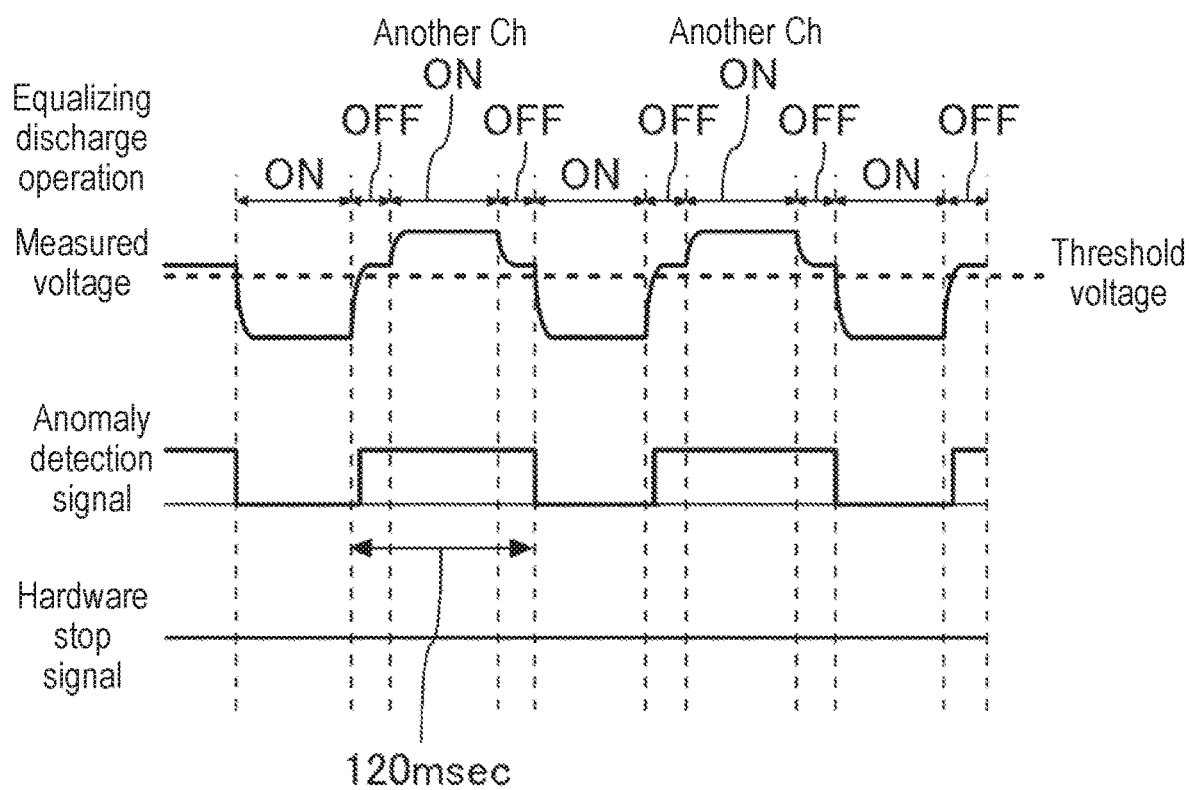
FIG. 3B is a diagram showing an example of an equalizing discharge operation for a plurality of cells and measured voltages of the plurality of cells according to a comparative example.

FIGS. 3A and 3B are diagrams showing an example of an equalizing discharge operation for the plurality of cells V1 to V3 and measured voltages of the plurality of cells V1 to V3 according to a comparative example. Since the voltages of the plurality of cells V1 to V3 finely change in a short time, the voltage measurement under software control using the controller 40 needs to be performed in a short cycle. FIG. 3A shows an example in which controller 40 acquires the voltages of the plurality of cells V1 to V3 in a cycle of 100 msec. In the 100 msec period as a unit cycle, a 80 msec period is a period during which the equalizing discharge is on, and a 20 msec period is a period during which the equalizing discharge is off. Controller 40 acquires each voltage of the plurality of cells V1 to V3 measured during the 20 msec period during which the equalizing discharge is off.

A threshold voltage shown in FIG. 3A is a threshold voltage for detecting an overvoltage, and when a voltage higher than the threshold voltage is detected, it is determined to be an overvoltage. Even if the equalizing discharge of the cell of a target channel is off, when the equalizing discharge of the cell of another adjacent channel is on, the measured voltage of the cell of the target channel is affected by the wiring resistance. For example, in the example shown in FIG. 1, even if the equalizing discharge of first cell V1 is off, when the equalizing discharge of second cell V2 is on, the measured voltage of first cell V1 becomes higher than the actual voltage. As a result, it may be erroneously determined to be an overvoltage even though the actual voltage of first cell V1 is within a normal range. Therefore, controller 40 acquires, as an effective measured voltage, a voltage of a target cell acquired during a period during which the equalizing discharge of the target cell is off and the equalizing discharge of the cells on both sides of the target cell is off.

FIG. 3B is a diagram in which anomaly detection signal ALM output from anomaly determination circuit 33 and the hardware stop signal output from delay circuit 50 are added to FIG. 2(a). Anomaly determination circuit 33 turns on anomaly detection signal ALM when the voltage measured by first voltage measurement circuit 32a becomes higher than the threshold voltage. Delay circuit 50 turns on the hardware stop signal when anomaly detection signal ALM is continuously turned on for more than or equal to a predetermined time (500 msec in the example shown in FIG. 3B). In the example shown in FIG. 3B, since a maximum continuous ON time of anomaly detection signal ALM is 120 msec, the hardware stop signal does not turn on. Therefore, in the example shown in FIGS. 3A and 3B, the hardware control by anomaly determination circuit 33 and delay circuit 50 does not function effectively.

As a countermeasure for this, it is conceivable to design the system such that a voltage drop value due to the wiring resistance of the external wiring is within an allowable value. However, it is difficult to keep the voltage drop value within the allowable value in consideration of the restriction of the wire harness and the degradation of the connector over time.

Next, it is conceivable to adjust a predetermined time for determining the cell voltage anomaly. For example, it is conceivable to change the predetermined time of 500 msec to less than or equal to 120 msec. However, there is a possibility of making an erroneous determination during a period during which the equalizing discharge of the cell of an adjacent channel is on.

Thus, it is conceivable to set the equalizing discharge off period to more than or equal to 500 msec. However, if the equalizing discharge off period is lengthened, the equalizing discharge on period is shortened, and the equalizing process is delayed. In the above example in which the voltage is measured in the cycle of 100 msec, the time for equalizing discharge cannot be set.

Thus, in this example, controller 40 sets, for each first cycle, a first equalizing discharge off period during which the voltages of the plurality of cells V1 to V3 are measured without an influence of the equalizing process during execution of the equalizing process between the plurality of cells V1 to V3 and includes, for each second cycle longer than the first cycle, a second equalizing discharge off period during which a determination result according to anomaly determination circuit 33 is fixed. The second equalizing discharge off period is set to be longer than the first equalizing discharge off period.

FIGS. 4A and 4B are diagrams showing an example of the equalizing discharge operation for the plurality of cells V1 to V3 and measured voltages of the plurality of cells V1 to V3 according to the example. Hereinafter, control to measure the voltages of the plurality of cells V1 to V3 for each predetermined cycle under software control using the controller 40 is referred to as intermittent equalization control. In the example shown in FIGS. 3A and 3B, the intermittent equalization control in which an equalizing discharge on period of 80 msec and an equalizing discharge off period of 20 msec are alternately repeated is executed.

In the example, a period during which the intermittent equalization control is turned off is periodically set. In each off period of the intermittent equalization control, a time longer than a predetermined time required to determine the cell voltage anomaly by delay circuit 50 is set. In the example shown in FIGS. 4A and 4B, the off period of the intermittent equalization control is set in a cycle of 20 seconds. In the 20 sec period as a unit cycle, a 16 sec period is a period during which the intermittent equalization control is on, and a 4 sec period is a period during which the intermittent equalization control is off. Delay circuit 50 detects whether or not anomaly detection signal ALM is continuously turned on for more than or equal to 500 msec while the intermittent equalization control is off for 4 seconds.

In the example described above, it is assumed that an allowable delay time of cell overvoltage can be set to be more than or equal to 20 seconds. When the allowable delay time is less than 20 seconds, it is necessary to set the unit cycle of the intermittent equalization control within the allowable delay time.

In the example shown in FIGS. 4A and 4B, the efficiency of the equalizing process is reduced by 20% as compared with the example shown in FIGS. 3A and 3B; however, the reduction can be offset by increasing an equalizing discharge current by 20%. When the equalizing discharge current is increased, the voltage drop value due to the wiring resistance increases; however, in this example, the cell voltage is measured during the equalizing discharge off period, so that the cell voltage is not affected by the voltage drop.

As described above, according to the present exemplary embodiment, in addition to the equalizing discharge off period of a short cycle for voltage measurement by software control, the equalizing discharge off period of a long cycle for detection of voltage anomaly by hardware control is set. Consequently, during the equalizing process, the voltage anomaly detection under hardware control can be effectively functioned, and the safety can be ensured by redundancy of the software control and the hardware control. Further, the equalizing discharge on period can be secured for as long as possible. Therefore, it is possible to improve safety while suppressing a decrease in efficiency of the equalizing process. Furthermore, by measuring the cell voltage during the equalizing discharge off period of a short cycle, it is possible to measure a highly accurate voltage that is not affected by the voltage drop due to the wiring resistance.

The present invention has been described based upon the exemplary embodiment. The exemplary embodiment is intended to be illustrative only and it will be obvious to those skilled in the art that various modifications to constituting elements and processes could be developed and that such modifications are also within the scope of the present invention.

In the above-described exemplary embodiment, the example in which the above-described equalizing process is used in power storage system 1 for in-vehicle use has been described. However, also in power storage system 1 for stationary power storage applications, the above-described equalizing process can be used. The above-described equalizing process can also be used in power storage system 1 for electronic devices such as notebook PCs and smartphones. For example, in the stationary power storage applications, when the cell voltage anomaly is detected by controller 40, the anomaly detection signal is notified to a higher-level device such as a cloud monitoring server or a HEMS (Home Energy Management System) controller.

Note that the exemplary embodiment may be defined by the following items.

[Item 1]

Management device (20) comprising:

voltage measurement unit (30) that measures each voltage of a plurality of cells (V1 to V3) connected in series;

a plurality of discharge circuits (31) connected in parallel to each of the plurality of cells (V1 to V3);

an anomaly determination circuit (33) that determines whether or not the voltage of each of cells (V1 to V3) measured by voltage measurement unit (30) is within a normal range; and controller (40) that executes an equalizing process between the plurality of cells (V1 to V3) by controlling the plurality of discharge circuits (31) based on the voltages of the plurality of cells (V1 to V3) measured by voltage measurement unit (30), wherein controller (40) sets, for each first cycle, a first discharge suspension period during which the voltages of the plurality of cells (V1 to V3) are measured without an influence of the equalizing process during execution of the equalizing process between the plurality of cells (V1 to V3) and sets, for each second cycle longer than the first cycle, a second discharge suspension period during which a determination result according to anomaly determination circuit (33) is fixed.

According to this, it is possible to improve safety while suppressing a decrease in efficiency of the equalizing process between the plurality of cells (V1 to V3).

[Item 2]

Management device (20) according to Item 1, wherein the second discharge suspension period is set to be longer than the first discharge suspension period.

According to this, anomaly determination circuit (33) can be effectively operated.

[Item 3]

Management device (20) according to Item 1, wherein voltage measurement unit (30) includes first voltage measurement circuit (32a) and second voltage measurement circuit (32b), first voltage measurement circuit (32a) supplies measured voltages of the plurality of cells (V1 to V3) to controller (40) and anomaly determination circuit (33), discharge circuit (31) is connected to second voltage measurement circuit (32b), and second voltage measurement circuit (32b) supplies the measured voltages of the plurality of cells (V1 to V3) to controller (40).

According to this, safety can be improved by making the voltage measurement circuit redundant.

[Item 4]

Management device (20) according to any one of Items 1 to 3, wherein controller (40) includes microcomputer (41), microcomputer (41) notifies higher-level control device (2) of an anomaly detection signal when at least one of the voltages of the plurality of cells (V1 to V3) acquired by communication from voltage measurement unit (30) is out of the normal range, and when at least one of the voltages of the plurality of cells is out of the normal range, after a delay time more than or equal to a time required for a stop processing by microcomputer (41) has passed, anomaly determination circuit (33) executes a hardware stop processing.

According to this, when both software control by microcomputer (41) and hardware control by anomaly determination circuit (33) are valid, stop processing can be performed by the software control.

[Item 5]

Power storage system (1) comprising:

a plurality of cells (V1 to V3) connected in series; and management device (20) according to any one of Items 1 to 4, that manages the plurality of cells (V1 to V3).

According to this, it is possible to construct power storage system (1) in which safety is improved while suppressing a decrease in efficiency of the equalizing process between the plurality of cells (V1 to V3).

The invention claimed is:

1. A management device comprising:
a voltage measurement unit that measures voltages of a plurality of cells connected in series;
a plurality of discharge circuits each connected in parallel to a respective one of the plurality of cells;
an anomaly determination circuit that determines whether or not each of the voltages of the plurality of cells measured by the voltage measurement unit is within a normal range; and
a controller that executes an equalizing process between the plurality of cells by controlling the plurality of discharge circuits based on the voltages of the plurality of cells measured by the voltage measurement unit,
wherein
the controller sets, for each first cycle, a first discharge suspension period during which the voltages of the plurality of cells are measured without an influence of the equalizing process during the execution of the equalizing process between the plurality of cells and sets, for each second cycle longer than the first cycle, a second discharge suspension period during which a determination result according to the anomaly determination circuit is fixed.

2. The management device according to claim 1, wherein the second discharge suspension period is set to be longer than the first discharge suspension period.

3. The management device according to claim 1, wherein
the voltage measurement unit includes a first voltage measurement circuit and a second voltage measurement circuit,
the first voltage measurement circuit supplies the voltages of the plurality of cells measured by the voltage measurement unit to the controller and the anomaly determination circuit,
the discharge circuit is connected to the second voltage measurement circuit, and
the second voltage measurement circuit supplies the voltages of the plurality of cells measured by the voltage measurement unit to the controller.

4. The management device according to claim 1, wherein
the controller includes a microcomputer,
the microcomputer issues an anomaly detection signal to a higher-level control device when at least one of the voltages of the plurality of cells acquired by communication from the voltage measurement unit is out of the normal range, and
when at least one of the voltages of the plurality of cells is out of the normal range, after a delay time longer than or equal to a time required for a stop processing by the microcomputer has passed, the anomaly determination circuit executes a hardware stop processing.

5. A power storage system comprising:
a plurality of cells connected in series; and
the management device according to claim 1, the management device managing the plurality of cells.

* * * * *